US007489903B2

(12) United States Patent
Johansson et al.

(10) Patent No.: US 7,489,903 B2
(45) Date of Patent: Feb. 10, 2009

(54) METHOD AND SYSTEM FOR EXCHANGING THE CAPACITY REPORTS IN A RADIO ACCESS NETWORK

(75) Inventors: Klas Johansson, Sundbyberg (SE); Martin Kristensson, Taby (SE); Uwe Schwarz, Veikkola (FI); Annti Tölli, Guadalimar (ES)

(73) Assignee: Nokia Corporation, Espoo (FI)

( * ) Notice: Subject to any disclaimer, the term of this patent is extended or adjusted under 35 U.S.C. 154(b) by 931 days.

(21) Appl. No.: 10/424,947

(22) Filed: Apr. 29, 2003

(65) Prior Publication Data

US 2004/0219912 A1 Nov. 4, 2004

(51) Int. Cl.
*H04B 17/00* (2006.01)
(52) U.S. Cl. ........... 455/67.11; 455/115.1; 455/405; 455/423; 455/425; 455/453; 455/454
(58) Field of Classification Search ........... 455/67.11, 455/115.1, 405, 423–425, 453, 454
See application file for complete search history.

(56) References Cited

U.S. PATENT DOCUMENTS

| | | | |
|---|---|---|---|
| 5,794,153 A * | 8/1998 | Ariyavisitakul et al. ..... | 455/507 |
| 5,974,308 A * | 10/1999 | Vedel ................. | 455/407 |
| 6,064,666 A * | 5/2000 | Willner et al. ............. | 370/352 |
| 6,430,398 B1 * | 8/2002 | Blanc ................. | 455/67.13 |
| 6,553,232 B1 * | 4/2003 | Shaffer et al. ............. | 455/440 |
| 6,754,470 B2 * | 6/2004 | Hendrickson et al. ..... | 455/67.11 |
| 6,973,491 B1 * | 12/2005 | Staveley et al. ........... | 709/224 |
| 7,002,923 B2 * | 2/2006 | Golitschek et al. ......... | 370/253 |
| 2002/0151304 A1 * | 10/2002 | Hogan ................. | 455/436 |
| 2004/0157600 A1 * | 8/2004 | Stumpert et al. ......... | 455/432.1 |
| 2005/0003824 A1 * | 1/2005 | Siris ................. | 455/452.1 |
| 2005/0277416 A1 * | 12/2005 | Tolli et al. ............. | 455/436 |
| 2006/0193289 A1 * | 8/2006 | Ronneke et al. ........... | 370/329 |

FOREIGN PATENT DOCUMENTS

| | | |
|---|---|---|
| EP | 1282321 B1 | 7/2002 |
| WO | WO 02/089514 | 11/2002 |
| WO | WO 03/069938 | 8/2003 |

\* cited by examiner

*Primary Examiner*—Quynh H Nguyen
(74) *Attorney, Agent, or Firm*—Squire, Sanders & Dempsey, L.L.P.

(57) ABSTRACT

The objective of the present invention is to provide means for exchanging usage information in the multioperator mobile networks. Despite the high amount of different reporting alternatives of the present invention, they are not contradicting each other but are only options for different needs. Also the purpose of the present invention is to provide a fair and easy solution to monitor the usage of the shared network.

37 Claims, 4 Drawing Sheets

Table 3a Example of new IE, "Operator specific maximum allowed load"

| IE/Group Name | Presence | Range | IE Type and Reference | Semantics Description |
|---|---|---|---|---|
| Operator specific maximum allowed load information | | 1..<maxnoofsharingoperators> | | |
| PLMN identity | M | | OCTET STRING (3) | - digits 0 to 9, two digits per octet,<br>- each digit encoded 0000 to 1001,<br>- 1111 used as filler<br>- bit 4 to 1 of octet n encoding digit 2n-1<br>- bit 8 to 5 of octet n encoding digit 2n<br>-The PLMN Identity consists of 3 digits from MCC followed by either<br>-a filler plus 2 digits from MNC (in case of 2 digit MNC) or<br>-3 digits from MNC (in case of a 3 digit MNC). |
| Cell Capacity Class value | M | | 9.2.1.5C | |
| Load Value | M | | 9.2.1.33A | |
| RT Load Value | M | | 9.2.1.50b | |
| NRT Load Information Value | M | | 9.2.1.41I | |

Table 3b Example with operator fractions (for Load Value, the same principle can be used also for RT Load Value and NRT Load Information Value) :

| IE/Group Name | Presence | Range | IE Type and Reference | Semantics Description |
|---|---|---|---|---|
| Uplink Load Value | M | | INTEGER(0..100) | Value 0 shall indicate the minimum load, and 100 shall indicate the maximum load. Load should be measured on a linear scale. |
| Downlink Load Value | M | | INTEGER(0..100) | Value 0 shall indicate the minimum load, and 100 shall indicate the maximum load. Load should be measured on a linear scale. |
| Operator specific load information | | 1..<maxnoofsharingoperators> | | |
| Uplink load share | M | | INTEGER(0..100) | Value 0 shall indicate the minimum load share, and 100 shall indicate the maximum load share. Uplink load share should be measured on a linear scale relative to the Uplink Load Value. |
| Downlink load share | M | | INTEGER(0..100) | Value 0 shall indicate the minimum load share, and 100 shall indicate the maximum load share. Downink load share should be measured on a linear scale relative to the Downink Load Value. |

Table 3c Example with operator specific load reports:

| IE/Group Name | Presence | Range | IE Type and Reference | Semantics Description |
|---|---|---|---|---|
| PLMN Identity | O | | | |
| Uplink Load Value | M | | INTEGER(0..100) | Value 0 shall indicate the minimum load, and 100 shall indicate the maximum load. Load should be measured on a linear scale. |
| Downlink Load Value | M | | INTEGER(0..100) | Value 0 shall indicate the minimum load, and 100 shall indicate the maximum load. Load should be measured on a linear scale. |

Fig 3

METHOD AND SYSTEM FOR EXCHANGING THE CAPACITY REPORTS IN A RADIO ACCESS NETWORK

FIELD OF THE INVENTION

The present invention relates to the telecommunication systems. In particular, the present invention relates to a novel and improved method and system for exchanging the capacity reports in a mobile communications network.

BACKGROUND OF THE INVENTION

In the current specifications of the third generation mobile networks (referred to as UMTS), the system utilises the same well-known architecture that has been used by all main second-generation systems. A block diagram of the system architecture of the current UMTS network is presented in FIG. 1. The UMTS network architecture includes the core network (CN), the UMTS terrestrial radio access network (UTRAN), and the user equipment (UE). The core network is further connected to the external networks, i.e. Internet, PLMN, PSTN and/or ISDN.

The GSM Phase 1/2 Core Network consists of network switching subsystem (NSS). The NSS further consists of the following functional units: Mobile Switching Center (MSC), Visitor Location Register (VLR), Home Location Register (HLR), Authentication Center (AC) and equipment identity register (EIR). The GSM Phase 2+ enhancements to the GSM phase 1/2 CN are serving GPRS (General Packet Radio Service) support node (SGSN), gateway GPRS support node (GGSN) and CAMEL service environment. The most important new feature that is introduced with GPRS is packet switching (PS). For UMTS, only minor modifications to the GSM Phase 2+ core network are needed. For instance, allocation of the transcoder (TC) function for speech compression.

UTRAN architecture consists of several radio network subsystems (RNS). The RNS is further divided into the radio network controller (RNC) and several base stations (BTS, referred to as B nodes in the 3GPP specifications).

In this architecture there are several different connections between the network elements. The Iu interface connects CN to UTRAN. The Iur interface enables the exchange of signalling information between two RNCs. Iur(-g) is in principle same as Iur but it is formed between two different type of radio access network, i.e. GERAN/UTRAN and therefore between two different types of network element, i.e. between base station subsystem (BSS) and RNC, respectively, for multiradio purposes. In the following text we refer to these two interfaces using notation Iur. The signaling protocol across the Iur interface is called radio network subsystem application part (RNSAP). RNSAP is terminated at both ends of the Iur interface by an RNC. Also there are Gb and A interfaces for connecting base station controller BSC and core network CN in GERAN. They can also be used to exchange load information (common measurements) between Iu mode RNCs/BSCs and A/Gb mode BSCs. Operator specific load measures could apply to those interfaces as well.

The Iub interface connects an RNC and a node B. The Iub interface allows the RNC and node B to negotiate about radio resources, for example, to add and delete cells controlled by node B to support communication of dedicated connection between UE and Serving RNC (S-RNC) information used to control the broadcast and paging channels, and information to be transported on the broadcast and paging channels. One node B can serve one or multiple cells. UE is connected to node B through the Uu radio interface. UE further consists of a subscriber identity module (USIM) and mobile equipment (ME). They are connected by the Cu interface. Connections to external networks are made through Gateway MSC (towards circuit switched networks) or GGSN (towards packet switched networks).

Radio Resource Management (RRM) e.g. in the GERAN (GSM/EDGE Radio Access Network; GSM, Global System for Mobile Communications; EDGE, Enhanced Data rates for GSM Evolution) and the UTRAN is responsible for utilization of air interface resources. The RRM is needed for e.g. maintaining the QoS (Quality of Service), planned coverage, and for offering high capacity. The RRM enables optimising service capacity and capability. The full scope of the RRM is large, and it can be divided into handover, power control, admission control, load control and packet scheduling functionalities Also, in coming multisystem, multilayer, or multioperator networks it is essential to utilise all the systems or layers in the most efficient way. For this reason, a new network function, the Common Radio Resource Management (CRRM), is being developed. The main functionality of the CRRM is to be able to direct the connections in the call set-ups and handovers to the optimum cell within optimum radio access technology (RAT) depending on the Quality of Service (QoS) requirements of the connection. The algorithms of the CRRM for the target cell selection and auto-tuning are based on the input parameters read from the respective interfaces, e.g. from the Iur(-g) interfaces. These parameters represent the status information of the different cells. Parameters can be, for example, the total load, RTLoad (RT, Real Time), and NRT Load (NRT, Non Real-Time). Another example in which common measurements have to be reported is the Iur-interface between different Radio Network Controllers (RNC). However, if CRRM is not supported in shared networks, they will loose some competitiveness because CRRM capacity gains cannot be utilized to full extent.

In this application we are considering mobile communication networks shared by two or more operators. Sharing a wireless network can be carried out by at least two different ways. Each operator sharing the network owns or is entitled to use its own air interface carrier or operators share the same air interface carrier, e.g. in national roaming or in mobile virtual network operators (MVNO). A mobile virtual network operator is a notation used for operators that accesses the radio resources via another operator's network. Sharing can also mean a combination of the two above-mentioned solutions.

To allow sharing in a controlled and pre-defined way—according to sharing agreements—operator specific Radio Resource Management (RRM) is needed. This would enable fair sharing of available capacity as well as service differentiation between the sharing operators.

Moreover, network sharing in the long term will be difficult if there is not enough individual control of the radio resources. In order to build longstanding and fruitful co-operation relationships and sharing agreements between the operators, more control over the resources is needed. This requires that each operator have to be able to control the resources dedicated to it, but also the reporting of the usage of the resources is needed.

Furthermore, because the capacity has not been so important in the rollout phase of shared networks, the sharing problem has been solved with over-dimensioning and mutual trust. However, there is no way to monitor the resource usage in specific cells for each operator, which makes it difficult to divide investments costs between the operators. The purpose of this invention is to provide means for exchanging usage information in the multioperator mobile networks. Despite the high amount of different reporting alternatives of the present invention, they are not contradicting each other, but are only options for different needs. Also the purpose of the present invention is to provide a fair and easy solution to monitor the usage of the shared network.

SUMMARY OF THE INVENTION

Consequently, the present invention concerns a novel and improved method and system for implementing operator specific resource usage reporting primarily in WCDMA networks shared as described above. Though mainly targeted for WCDMA with a high capacity to share per carrier, the invention is obviously also applicable to other cellular network standards. The invention allows operator specific resource usage reporting not only over Iur interface—but also over Iu interface and over interfaces between different network nodes.

The invention is to report the available load per operator between Radio Network Controllers (RNC) in a WCDMA network, or between BSC (in GERAN) and RNC (in UTRAN). With such load reports, it is possible to use Common Radio Resource Management (CRRM) in order to achieve statistical multiplexing gain between multiple systems where at least one system is a shared network as described above. This is useful in future shared networks which are capacity limited, e.g. in urban areas.

There can be an additional information element included in the messaging in the above-mentioned interfaces or between two nodes of said network. Said information element can further include an additional tag to identify the operator whose capacity usage is being reported.

In one embodiment of the present invention different user groups are representing different categories of user groups, the category being defined on the basis of total usage of the capacity per user. These categories can be e.g. gold, silver or bronze indicating the value of the subscriber in certain category.

There is different ways to implement the reporting. At least following embodiments are applicable for reporting the capacity usage or load per operator. In one preferred embodiment the measurements are multiplied for each operator. In another embodiment of the present invention the shares in percents used by each operator for RT (real time load), NRT (non-real time load) and total load are reported over the Iur interface. In the third embodiment, operator specific maximum cell capacities are reported, even though they may be configured by Operation & Maintenance (O & M) functions, instead of maximums. Finally, in one embodiment the reporting can be implemented by combining any of the above solutions.

In a preferred embodiment of the present invention the total cell load is a percentage value that shows the relative total load of the cell, real time load is a percentage value that shows the relative load, grouped on real time data users, maximum cell capacity is a number defined by the operator, the number giving an absolute reference to the maximum cell capacity, and non-real-time load represents an agreement that has four levels of usage, the levels being Low, Medium, High, and Overloaded.

In one preferred embodiment of the present invention the user groups are defined on the basis of at least one of the following criteria: user group consists of customers belonging to the one of the sharing operators, international roaming users hosted by the shared network, international roaming users hosted by one of the sharing operators, or customers belonging to virtual network operator hosted by one of the sharing partners.

Thanks to the present invention the support of CRRM in shared networks will boost competitiveness because CRRM capacity gains can be utilized to full extent. Furthermore, an example of the benefits of the present invention is the operators that do not own both 2 G, e.g. GSM, and 3 G, e.g. WCDMA, networks. These operators will lease capacity from some other operators 2 G or 3 G network, e.g. via national roaming agreements. For these scenarios a standardized CRRM solution and reporting the network usage is important to be supported in the future.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 3 includes three tables describing examples of information elements according to one embodiment of the present invention.

DETAILED DESCRIPTION OF THE INVENTION

Reference will now be made in detail to the embodiments of the present invention, examples of which are illustrated in the accompanying drawings.

Figure 1:
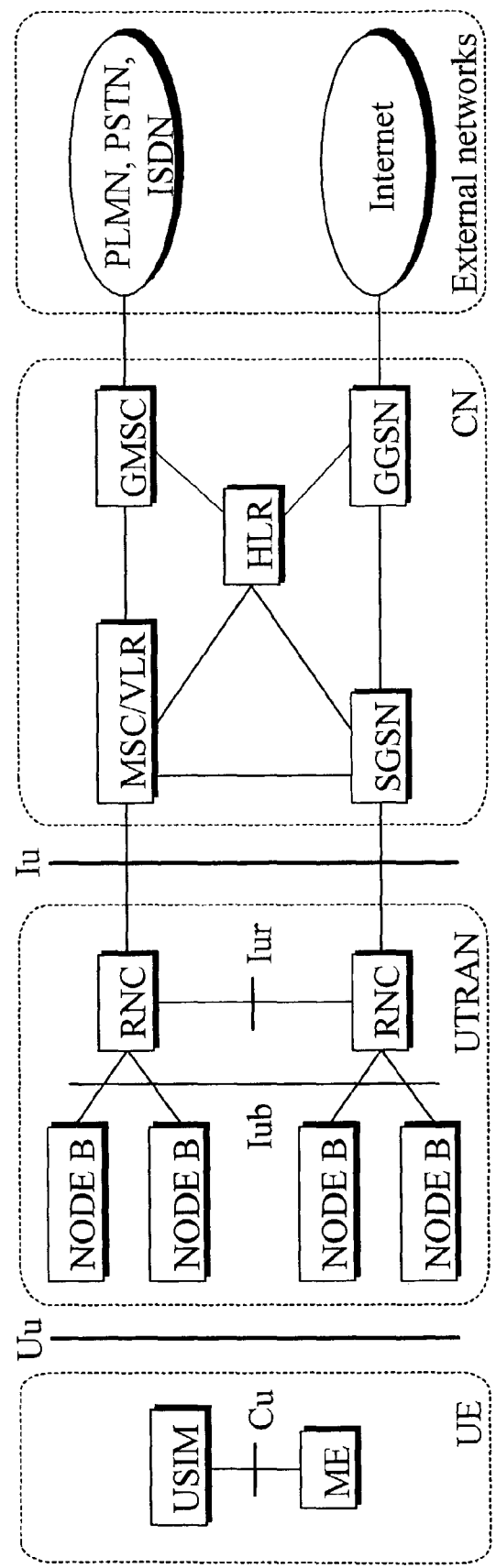
FIG. 1 is a block diagram illustrating an example of the state of the art scenario relating to the present mobile network.
Figure 2:
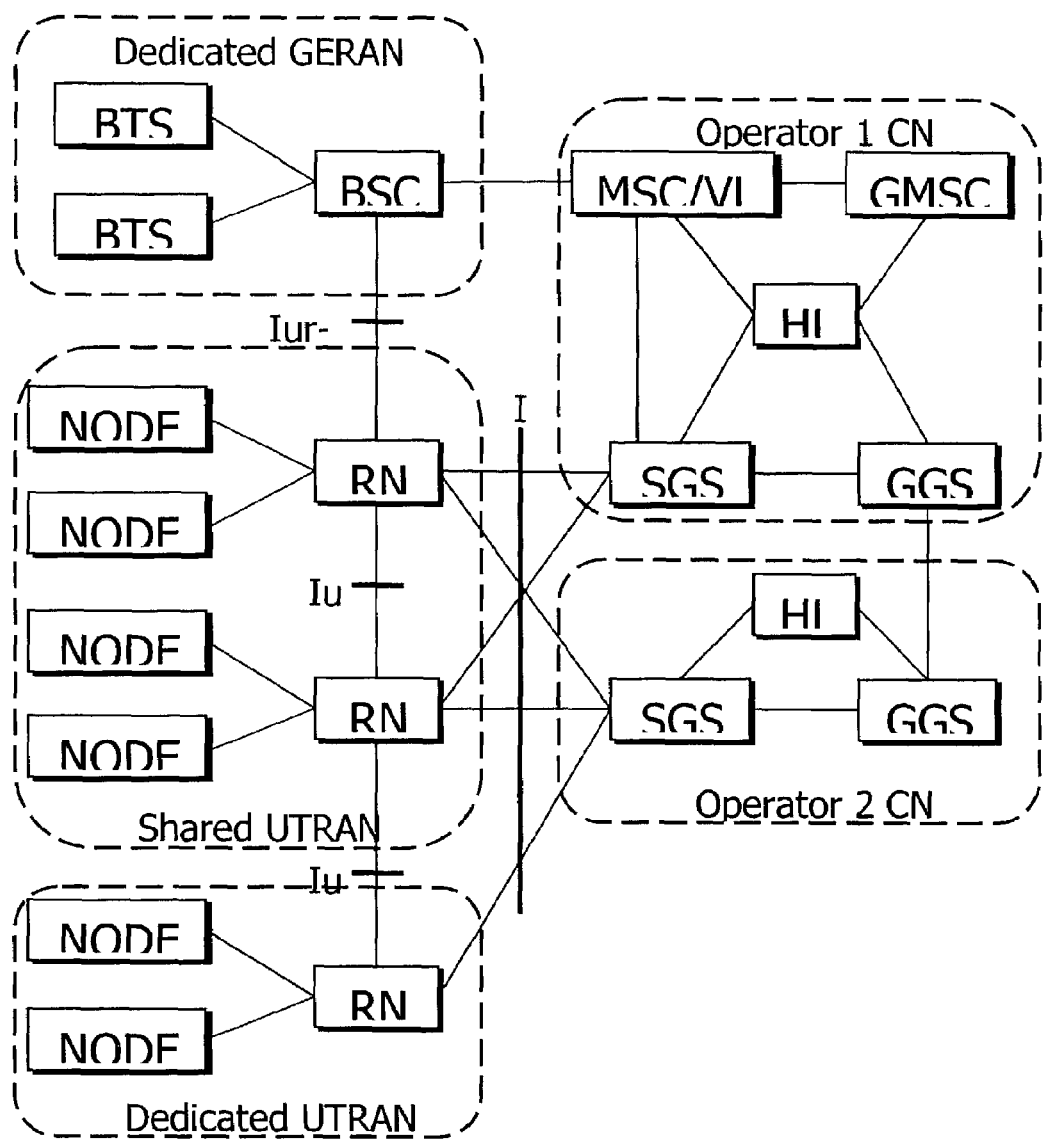
FIG. 2 is a block diagram illustrating the load reporting according to one embodiment the present invention.

In FIG. 2 is presented a block diagram including the essential elements from the present invention point of view. Radio access network in FIG. 2 is divided into three different parts, each of them defining an own entity. This allocation is based on the one hand on the operator that is in response from the network and on the other hand on the technique behind the network. Also in FIG. 2 is presented the core network and its allocation between the two operators. In practice said different networks are separate networks formed by own dedicated network elements.

The system in FIG. 2 includes the core network CN, divided into two parts, Operator 1 CN and Operator 2 CN. Operator 1 CN includes Mobile Switching Center or Visitor Location Register MSC/VLR that is connected to Home Location Register, HLR and GSM Mobile Switching Center GMSC. It further includes Serving GPRS Support Node SGSN and gateway GPRS support node GGSN. Operator 2 CN includes respectively Home Location Register, HLR and Serving GPRS Support Node SGSN and gateway GPRS support node GGSN.

Core networks Operator CN 1 and 2 are connected to different radio access networks over Iu-interface that is formed between certain network elements of the radio access network and the core network. These connections are very well documented in standards and therefore we do not describe them more precisely. In FIG. 2 is presented three different radio access networks: Dedicated GERAN, Shared UTRAN, and Dedicated UTRAN. Dedicated GERAN includes two base stations BTS and a base station controller BSC. Base stations BTS are connected to said base station controller BSC. One operator owns and administers this network. Shared network includes two radio network controllers RNC and four base stations NODE B, which are connected to RNCs. Shared UTRAN can be owned and administered jointly by two or more operators. Lastly there is a dedicated UTRAN, which includes a radio network controller RNC and two base stations NODE B connected to RNC. Iur interface is formed between radio network controllers and Iur-g interface between RNC and BSC. Also these interfaces are very well documented in standards and therefore we do not describe them more precisely.

For CRRM, a number of measurement reports have been standardized in 3GPP for the Iur(-g) interface. Those measurements are Total Cell Load, RT Load, Max Cell Capacity, and NRT Load. In order to allow CRRM trunking gains in shared networks operator specific load is exchanged over Iur(-g). The invention is to report the available load per operator between Radio Network Controllers RNC, and between Radio Network Controllers RNC and Base station controllers BSC (Iur-g in FIG. 2). Also it is possible to measure and report the available capacity over the Iu-interface, and to report the same between different network elements as is described in FIG. 2 with fixed lines.

There could be different ways to implement the measurement report, and at least the following solutions are possible: (a) Multiply the above 4 measurements for each operator; (b) Report shares in % used by each operator for RT, NRT and total load; (c) Operator specific maximum cell capacities (may be configured by O&M instead); and (d) Any combination of the above solutions.

These solutions and embodiments are not only related to RRM (Radio Resource Management) and RAN, but possibly also to ideas about corresponding measurements towards CN/OSS and more long term oriented capacity management. The key ideas relating to these issues are: (a) provide operator specific capacity reports to all the involved elements (RAN elements, CN elements and OSS elements) within the shared network; (b) provide operator specific capacity reports from the elements in the shared network to elements in the dedicated networks (home networks); and (c) utilize this information for load control and prioritization in the shared network (either in CN, RAN (RRM), or in OSS by policy based management).

This would require including not only RAN and RRM, but also message exchange over the Iu-interface towards the core network elements and towards the GGSN/GMSC/OSS in the neighboring networks in case of a shared gateway core network.

Referring then to FIG. 3 that includes three tables, the examples of load reports and information elements according to the present invention is presented. The idea with sharing load reports between RNCs is to take current cell load into account in load and service based handovers. Hereby, load sharing can be achieved when there is coverage in multiple systems and cell layers. Operator specific load reports over Iur(-g) can be useful in a shared network if there is some capacity in each cell dedicated for specific operators, or if dynamic priority levels are used based on operator specific load measurements.

In the current RNSAP specification, TS25.423, the following Information Elements (IE) are used in the common measurement reporting procedure to report the load to other RNCs. Cell Capacity Class value, Load Value (Integer between 0 and 100, linear scale), RT Load Value (Integer between 0 and 100, linear scale), NRT Load Information Value (Integer between 0 and 3: low, medium, high and overload).

The basic idea with the operator specific load thresholds is that operators only are admitted below a certain load threshold. For instance, one operator can be admitted only at low load whereas another is admitted as long as the cell is not in overload. For this, a new IE indicating the maximum allowed load for each operator is required. The same IEs used to signal the load can be reused, see table 1 in FIG. 3. The new IE here is PLMN identity and it is just one possible identifier of a user group. One could also use e.g. the Allocation Retention Priority (ARP) or some new identifier of a shared RAN.

In addition to operator specific load thresholds, the actual load can be measured per sharing operator in each cell. In addition to operator specific load thresholds, the actual load can be measured per sharing operator in each cell. This then needs to be signaled over Iur(-g).

If it is signaled as an addition to the current load reports, it indicates the fraction of the load used by each operator (see table 2 in FIG. 3). If it is signaled as operator specific load reports, then one has to add e.g. the PLMN of the sharing operator to the existing IEs.

In the above mentioned tables is presented only possible examples of new information elements and load reporting and the present invention is not meant to be restricted to these examples.

It is obvious to a person skilled in the art that with the advancement of technology, the basic idea of the invention may be implemented in various ways. The invention and its embodiments are thus not limited to the examples described above or to WCDMA; instead they may vary within the scope of the claims.

The invention claimed is:

1. A method comprising:
   monitoring different user groups in a cellular radio access network to determine capacity usage of the cellular radio access network by each of the different user groups, wherein capacity of the network is used by at least two of the different user groups, wherein the network is shared by at least two operators; and
   exchanging information between the at least two operators, the information indicating the capacity usage of one of the monitored user groups, wherein the exchanging comprises reporting load information over Iur, Iu, or Iur-g interfaces in the network.

2. The method according to claim 1, wherein said load information is reported over the Iur-interface of said network.

3. The method according to claim 1, wherein said load information is reported over the Iur-g-interface of said network.

4. The method according to claim 1, wherein said load information is reported over the Iu-interface of said network.

5. The method according to claim 1, wherein an additional information element is included in messaging between two nodes of said network, said information element comprising an additional tag to identify the user group.

6. The method according to claim 5, wherein the capacity usage is included in said additional information element.

7. The method according to claim 1, wherein said different user groups are representing, respectively, different categories of user groups, each of the categories being defined on the basis of total usage of the capacity per each of the user groups.

8. The method according to claim 1, wherein said capacity usage is reported separately for at least one of the following measures: total cell load, real-time load, maximum cell capacity, and non-real-time load.

9. The method according to claim 8, wherein said capacity usage is reported separately for the total cell load, and wherein the total cell load comprises a percentage value that shows the relative total load of the cell.

10. The method according to claim 8, wherein said capacity usage is reported separately for the real-time load, and wherein the real time load comprises a percentage value that shows the relative load, grouped on real time data users.

11. The method according to claim 8, wherein said capacity usage is reported separately for the maximum cell capacity, and wherein the maximum cell capacity comprises a number defined by the operator, the number giving an absolute reference to the maximum cell capacity.

12. The method according to claim 8, wherein said capacity usage is reported separately for the non-real-time load, and wherein the non-real-time load represents an agreement that has four levels of usage, the levels being Low, Medium, High, and Overloaded.

13. The method according to claim 8, wherein the indicating comprises multiplying the usage to all operators sharing said network.

14. The method according to claim 1, wherein each of said different user groups is associated, respectively, with one of the operators.

15. The method according to claim 1, wherein the user groups are defined on the basis of one of the following criteria: a user group consists of customers belonging to the one of the sharing operators, international roaming users hosted by the shared network, international roaming users hosted by one of the sharing operators, or customers belonging to virtual network operator hosted by one of the sharing partners.

16. An apparatus comprising:
monitoring means for monitoring different user groups in a cellular radio access network and for determining capacity usages of at least two of the different user groups in the cellular radio access network;
exchanging means for exchanging information between at least two operators, the information indicating the capacity usage of at least one of said monitored user groups, the exchanging means reporting load information over Iur, Iu, or Iur-g interfaces in the cellular radio access network,
wherein the at least two different user groups are using network capacity, and wherein the network is shared by the at least two operators.

17. The apparatus according to claim 16, wherein an additional information element is included in messaging between two nodes of said network, said information element comprising an additional tag to identify said user group.

18. The apparatus according to claim 16, wherein the capacity usage is included in said additional information element.

19. The apparatus according to claim 16, wherein said different user groups are representing different categories of user groups, each of the categories being defined on the basis of total usage of the capacity per each of the user groups.

20. The apparatus according to claim 16, wherein said capacity usage is reported separately for at least one of the following measures: total cell load, real-time load, maximum cell capacity, and non-real-time load.

21. The apparatus according to claim 19, wherein said capacity usage is reported separately for the total cell load, and wherein the total cell load comprises a percentage value that shows the relative total load of the cell.

22. The apparatus according to claim 19, wherein said capacity usage is reported separately for the real-time load, and wherein the real time load comprises a percentage value that shows the relative load, grouped on real time data users.

23. The apparatus according to claim 19, wherein said capacity usage is reported separately for the maximum cell capacity, and wherein the maximum cell capacity comprises a number defined by the operator, the number giving an absolute reference to the maximum cell capacity.

24. The apparatus according to claim 19, wherein said capacity usage is reported separately for the non-real-time load, and wherein the non-real-time load represents an agreement that has four levels of usage, the levels being Low, Medium, High, and Overloaded.

25. The apparatus according to claim 19, wherein the apparatus further comprises a multiplier for multiplying the reported usage to all operators sharing said network.

26. The apparatus according to claim 19, wherein each of said different user groups belong one of said operators.

27. A apparatus comprising:
a monitoring unit configured to monitor different user groups in a cellular radio access network and to determine capacity usages of at least two of the different user groups in the cellular radio access network; and
an indicating unit configured to exchange information between at least two operators, the information configured to indicate the capacity usage of one of said different user group, comprising reporting load information over Iur, Iu, or Iur-g interfaces in the cellular radio access network, in which at least two of the different user groups are using network capacity, and wherein the network is shared by the at least two operators.

28. The apparatus according to claim 27, wherein an additional information element is included in messaging between two nodes of said network, said information element including an additional tag to identify said user group.

29. The apparatus according to claim 27, wherein the capacity usage is included in said additional information element.

30. The apparatus according to claim 27, wherein said different user groups are representing different categories of user groups, the category being defined on the basis of total usage of the capacity per each of the user groups.

31. The apparatus according to claim 27, wherein said capacity usage is reported separately for at least one of the following measures: total cell load, real-time load, maximum cell capacity, and non-real-time load.

32. The apparatus according to claim 31, wherein said capacity usage is reported separately for the total cell load, and wherein the total cell load comprises a percentage value that shows the relative total load of the cell.

33. The apparatus according to claim 31, wherein said capacity usage is reported separately for the real-time load, and wherein the real time load comprises a percentage value that shows the relative load, grouped on real time data users.

34. The apparatus according to claim 31, wherein said capacity usage is reported separately for the maximum cell capacity, and wherein the maximum cell capacity comprises a number defined by the operator, the number giving an absolute reference to the maximum cell capacity.

35. The apparatus according to claim 31, wherein said capacity usage is reported separately for the non-real-time load, and wherein the non-real-time load represents an agreement that has four levels of usage, the levels being Low, Medium, High, and Overloaded.

36. The apparatus according to claim 31, wherein the apparatus further includes a multiplier for multiplying the reported usage to all operators sharing said network.

37. The apparatus according to claim 31, wherein said different user groups are belonging to separate operators.

\* \* \* \* \*

UNITED STATES PATENT AND TRADEMARK OFFICE
CERTIFICATE OF CORRECTION

| | |
|---|---|
| PATENT NO. | : 7,489,903 B2 |
| APPLICATION NO. | : 10/424947 |
| DATED | : February 10, 2009 |
| INVENTOR(S) | : Klas Johansson et al. |

It is certified that error appears in the above-identified patent and that said Letters Patent is hereby corrected as shown below:

On the Title Page Item (75) the third inventor's first name should read:

--Antti--

On the Title Page Item (75) the second inventor's city should read:

--Täby--

On the Title Page Item (75) the third inventor's city should read:

--Guadalmar--

Signed and Sealed this

Twelfth Day of May, 2009

JOHN DOLL
*Acting Director of the United States Patent and Trademark Office*